Figures 1, 2:
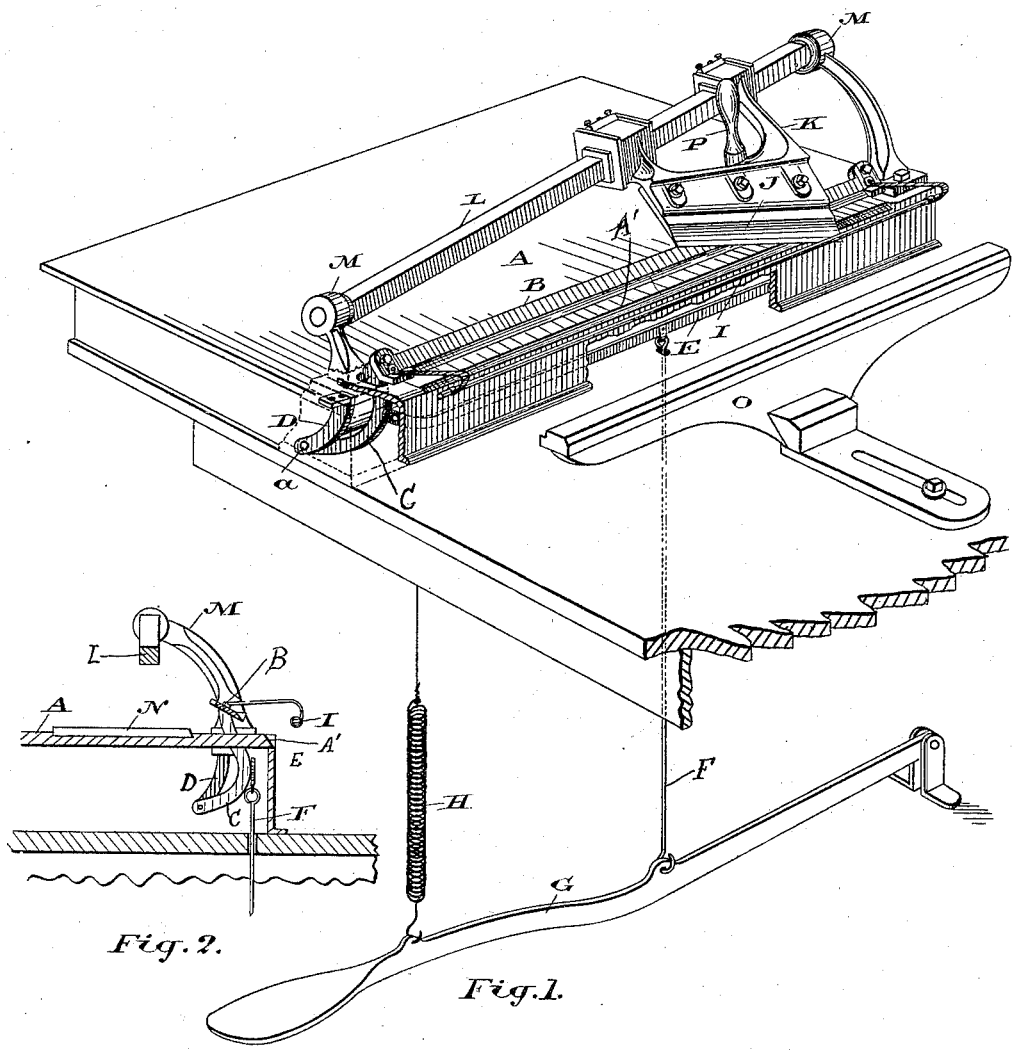

(No Model.)

W. AMES.
MACHINE FOR SHEARING CARD BOARD.

No. 324,633. Patented Aug. 18, 1885.

Witnesses.
J. B. Fshustonhaugh.
Jas. E. Maybee

Inventor.
Walter Ames.
by Donald C. Ridout & Co.
Att'y.

UNITED STATES PATENT OFFICE.

WALTER AMES, OF TORONTO, ONTARIO, CANADA.

MACHINE FOR SHEARING CARD-BOARD.

SPECIFICATION forming part of Letters Patent No. 324,633, dated August 18, 1885.

Application filed January 23, 1885. (No model.) Patented in Canada January 26, 1885, No. 20,966.

*To all whom it may concern:*

Be it known that I, WALTER AMES, of the city of Toronto, in the county of York, in the Province of Ontario, Canada, mechanic, have invented a certain new and useful Machine for Shearing Sheets of Card-Board, &c.; and I do hereby declare that the following is a full, clear, and exact description of the same.

The invention relates to a machine for cutting card-board; and the novelty consists in the construction, arrangement, and adaptation of parts hereinafter more fully described, and pointed out in the claims.

I provide a cutting-knife which slides upon a guide-bar arranged at an incline to the bearing-edge of the table. The knife is beveled, and as it is forced along the guide-bar different portions of the cutting-edge are brought into contact with the paper in quick succession. I provide gages and clamps for guiding and holding the paper.

In the drawings, Figure 1 is a perspective view, partially in section, showing the parts of the machine involved in my invention. Fig. 2 is a cross-section (slightly reduced in scale) of the edge of the table against which the knife acts and of the bar arranged to hold the card-board during the period it is being cut.

A represents the top of an ordinary table, on which the sheet of card-board to be cut is placed, having knife-bearing A'.

B is the holding-bar, below which the card-board to be cut is placed. This holding-bar B is rigidly fastened to the arms C, pivoted at *a* to brackets D, which are fastened at each end of and below the table, as indicated, only one bracket D being visible in the drawings.

E is a bar which connects the two arms C together. F is a rod connecting the bar E to the foot-lever G, which is suitably pivoted on the floor, as indicated.

H is a spiral spring designed to support the foot-lever G and through the rod F and bar E hold up the holding-bar B sufficiently far from the table A to allow of the free passage of card-board or other material to be cut. When the card-board is adjusted into the proper position, pressure is directed against the foot-lever G, and through it the bar B is brought against the top of the card-board or other material, holding it firmly in position in proportion to the weight placed on the lever G.

I is a supplemental holding-bar designed to hold down the end of the card-board projecting beyond the knife. If it were not for this supplemental holding-bar I the portion of the card-board projecting beyond the knife would curl up as it was detached from the main body.

J is a cutting-blade fastened to the bracket K, which is provided with suitable bearing-boxes arranged to fit onto the guiding-bar L. This bar L, it will be noticed, is supported at either end by the brackets M, which are formed and located as indicated so as to support the bar L at an angle to the edge of the table against which the blade J rests. By thus setting the bar L at an angle the edge of the cutting-blade J will be drawn across the material being acted upon, and consequently a clean cut will be insured and the entire edge of the blade will be brought into action.

My machine is specially designed for shearing photographic mounts, but of course it may be used for shearing or cutting other material. It being designed for beveling the edges of photograph-mats, the blade is, as shown, set at an inclination so as to produce the desired bevel; but of course it is not necessary that this inclination should be maintained.

I may also mention that the bar L is made round at the ends, and is journaled in the brackets M so that it will rock in them. The shaft or guide-bar L, by reason of its capacity to rock in its journals, will accommodate itself to the various positions of the knife.

The foregoing description will be sufficient to enable any mechanic, with the assistance of the drawings, to construct the machine, and it also indicates its general operation; but I may say, in conclusion, that when the sheet of material to be cut is placed below the holding-bar B its square edge should be pressed against the guiding-slat N. Its free end is then carried below the supplemental holding-bar I, and, if desired, may be brought against the gage O. The foot should then be placed upon the lever G, and sufficient pressure placed upon it to bring down the holding-bar B sufficiently strong to hold the sheet in position. The handle P should then be seized, and the cutting-blade J, which is at the top of the guiding-bar L, is drawn to the bottom, the edge of the blade J being thus drawn across the sheet being cut, insuring thereby the clean severance of the material.

What I claim as my invention is—

1. In a paper-cutting machine, the combination, with a table having a knife-bearing edge, A', and with a rocking guide-bar arranged obliquely thereto, of a cutting-blade supported by and arranged to slide upon the guiding-bar and to be drawn from one end toward the other end of the bar and along the bearing-edge of the table, substantially as and for the purposes specified.

2. The combination, with the table having transverse knife-bearing edge A', and with the guide-bar L, mounted loosely in journals M and arranged obliquely to the edge A', of the bracket K and knife J, having beveled edge, as and for the purposes set forth.

3. The combination, with the table A, having edge A', and with the guide O, oblique rocking guide-bar L, and beveled knife J, as described, of the clamps B and I, connected together, as described, the bar E, treadle, and spring, all arranged and operating as and for the purposes set forth.

4. In a paper-cutting machine substantially as described, the combination, with the presser-bar B, arranged upon one side of the path of the knife, of the presser-bar I, secured to the bar B by spring-arms and arranged on the opposite side of said path, and a treadle-lever, as G, and connections, as set forth.

Toronto, January 7, 1885.

WALTER AMES.

In presence of—
CHARLES C. BALDWIN,
F. BARNARD FETHERSTONHAUGH.